United States Patent [19]

Ripin et al.

[11] Patent Number: 4,758,795
[45] Date of Patent: Jul. 19, 1988

[54] MICROWAVE PULSE COMPRESSION IN DISPERSIVE PLASMAS

[75] Inventors: Barrett H. Ripin, Bethesda; Wallace Manheimer, Silver Spring, both of Md.

[73] Assignee: The United States of America as represented by the Secretary of the Navy, Washington, D.C.

[21] Appl. No.: 880,866

[22] Filed: Jul. 1, 1986

[51] Int. Cl.[4] .......................... H01S 1/00; H01P 1/00; H01J 25/34
[52] U.S. Cl. .................................. 330/4; 333/99 PL; 330/4.6
[58] Field of Search .............................. 332/16 R, 27; 333/99 PL, 157; 330/4, 4.6; 315/3.5

[56] References Cited

U.S. PATENT DOCUMENTS

| | | | |
|---|---|---|---|
| 3,317,784 | 5/1967 | Ferrari | 333/99 PL |
| 3,525,953 | 8/1970 | Halverson | 333/99 PL |
| 3,668,568 | 6/1972 | Morgenthaler | 330/4.6 |
| 4,000,036 | 12/1976 | Ensley | 376/123 |
| 4,575,692 | 3/1986 | Goldie | 333/99 PL |
| 4,612,641 | 9/1986 | Corkun | 372/76 |

OTHER PUBLICATIONS

Lampe et al., "Submillimeter Wave Production . . . Front", 3/77, 15 pages, NTIS AD-A037613/7, NRL.
Same as above, except, IEEE Trans. Microw. Theory & Tech., vol. MTT-25, No. 6, pp. 556-558, 6/77.
Reflection of . . . Ionization Front", Lampe et al., 12/1976, IEEE Puerto Rico Conf., pp. 144-145.
Fisher et al., "Pulse Compression . . . Chains II", 1/75, pp. 46-52, IEEE, S.Q.E., vol. QE-11, #1.

Primary Examiner—Nelson Moskowitz
Attorney, Agent, or Firm—Thomas E. McDonnell; Andrew M. Lesniak

[57] ABSTRACT

A plasma-filled waveguide acts as a dispersive element for pulse compression or power multiplication of a frequency chirped microwave signal. In one embodiment, the frequency of the source is chirped near a plasma resonance while the plasma waveguide is held contant in time. In a second embodiment, the source frequency is held fixed while the plasma filled waveguide parameters are varied in time in the vicinity of a plasma resonance.

13 Claims, 4 Drawing Sheets

MICROWAVE PULSE COMPRESSION IN DISPERSIVE PLASMAS

BACKGROUND OF THE INVENTION

The present invention relates to power multiplication of microwave signals and more specifically to pulse compression of high power microwave pulses with a plasma filled waveguide.

Use of a frequency chirped (frequency changing in time) pulse in conjunction with a passive dispersive delay element to compress microwave pulses was invented in the World War II era. If the group velocity of an electromagnetic wave increases with frequency in a dispersive device, such as in a waveguide above cutoff, then the tail end of a microwave pulse can catch up to the leading edge, providing the pulse frequency is increased throughout the pulse duration. For many radar applications, the dispersion and compression may be done either in the transmit or receive phase. The chirped-pulse, dispersive-delay-element, pulse-compression scheme, as well as use of a microwave waveguide as the dispersive element was disclosed in U.S. Pat. No. 2,624,876, and the use of passive lumped electrical circuitry in U.S. Pat. No. 2,678,997. The same basic compression idea has been applied to acoustic pulse compression (British Patent No. 604,429) and laser pulse compression (E. A. McLean, R. H. Lehmberg, J. M. McMahon, B. H. Ripin, J. A. Stamper, and S. E. Bodner, "Shadowgraph and Interferometry Experiments with a Ten-picosecond Light Source at Various Wavelengths," SPIE Vol. 97 International Conference on High Speed Photography (1977)).

The ideas of using plasma filled devices as passive microwave components, L. Goldstein, IRE Trans. *MTT*-6, 19 (1958), and the use of very short pulse propagation as a density plasma diagnostic, H. Schmitt, IEEE Trans. Nucl. Sci. *NS*-11, 125 (1964), H. Schmitt, IEEE Trans. *MTT*-13, 472 (1965), are quite old. Goldstein utilized the difference in phase velocity of the two principal waves along the magnetic field in a plasma to produce Faraday rotators and phase shifters. Also, he suggested an isolator based on the difference in damping rate between the right and left hand circularly polarized waves. The problem with these devices, however, was that they were based on gas discharges and the fractional ionization was very low, typically about $10^{-5}$. Thus, the physics turned out to be dominated in great measure by electron neutral collisions. For instance, Goldstein has shown that at microwave powers as low as six milliwatts, the resonant heating of the electrons due to electron-neutral collisions gives a large shot-to-shot variation in the characteristics of the device.

All of the above-identified schemes for pulse compression are not able to attain pulse compression of very high power microwaves i.e., achieving power multiplication of 10-100 times a gigawatt of input energy.

SUMMARY OF THE INVENTION

Accordingly one object of the invention is to compress high power microwave pulses.

Another object of the present invention is to decouple the microwave source operation from the compression of the microwave pulse.

Yet another object of the invention is to achieve power multiplication during the compression of the microwaves.

These and other objects of the present invention are achieved with a power multiplication apparatus for microwaves comprising a plasma-filled waveguide and means for making the plasma steady state. In another embodiment the power multiplication device comprises a plasma-filled waveguide and means for making the plasma time-varying.

The invention provides a pulse compression apparatus comprised of means for injecting a plasma into a waveguide where the plasma, because it is a dispersive plasma, subsequently allows microwaves of different frequencies to travel at different velocities; means for making the plasma steady state or time-varying, depending on choice; and means for introducing a chirped or a fixed frequency microwave pulse signal, depending on choice, into the plasma to shorten the duration of the signal to multiply the power of the signal as microwaves of different frequencies are compressed by the plasma.

The invention provides a pulse compression method comprising the steps of injecting a plasma into a waveguide where the plasma subsequently allows microwaves of different frequencies to travel at different velocities, making the plasma steady state or time-varying, depending on choice, and introducing a chirped or a fixed frequency microwave pulse signal into the plasma to shorten the signal duration to multiply the power of the signal as microwaves of different frequencies are compressed by the plasma.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
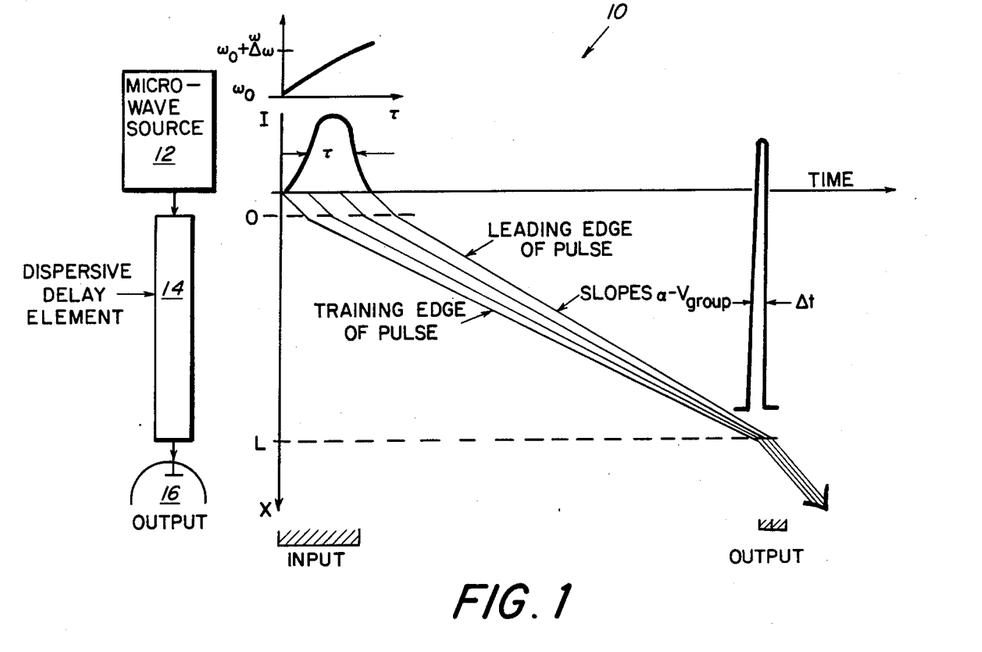
FIG. 1 is a schematic drawing of the dispersive line pulse compression scheme.

Referring now to the drawings, wherein like reference numerals designate identical or corresponding parts throughout the several views, and more particularly to FIG. 1 thereof, there is shown a schematic drawing of the dispersion line pulse compression scheme 10. A microwave source 12 produces a frequency chirped signal of time t that is introduced into a dispersion delay element 14 comprising a plasma-filled waveguide. The plasma in the waveguide causes the trailing end of the pulse to have a higher group velocity than the leading edge, so that the tail of the signal catches up the head. At the end of the dispersion delay element a compressed signal 16 of time $\Delta t$ is produced that is 10–100 times as powerful as the signal introduced into the waveguide.

More specifically imagine that a pulse enters the guide at t=0 and that the guide has length L. If the first part of the pulse has group velocity $V_g(0)$, the time to emerge out the other end of the guide is $T=L/V_{go}$. For a portion of the pulse entering at a later time t, the condition that it also emerge at time T is $$T = L/V_{go} = t + L/V_g(t) \quad (1)$$

where $V_g(t)$ is the group velocity of the portion of the pulse that entered at time t. For pulse compression $V_g$ must be an increasing function of time to enable the later parts of the pulse to "catch up" to the earlier portions. Notice that while the frequency must be well controlled as a function of time, there is no need for the amplitude to be particularly well controlled. Thus, utilization of this scheme is less demanding than other methods for short pulse propagation requiring both frequency and amplitude control. This means of pulse propagation is shown schematically in FIG. 1. Pulse compression by a factor of fifty to one hundred is possible with this technique.

Since the group velocity is a specified function of frequency, the variation of group velocity with time implies a variation of frequency with time, or in other words a "chirp" to the pulse (the group velocity of the pulse is actually of primary interest. The group velocity is defined by the relation $V_{go} = d\omega/dk$, where $\omega(k)$ is the dispersion relation of the plasma). For high-power microwave pulses, a plasma loaded waveguide is very attractive because, first, the plasma can withstand very high power propagation, and second, the plasma can be very dispersive. Moreover, since the plasma, not the waveguide, causes the dispersion, the waveguide can be oversized which allows much higher power operation than the (much smaller) vacuum waveguide.

Figure 2:
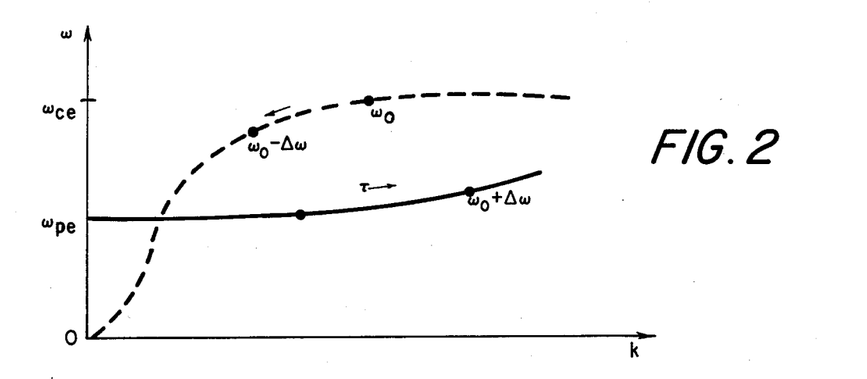
FIG. 2 is the (w,k) diagram for plasma loaded waveguide modes (-) and for the right-hand circularly polarized cyclotron mode (- - -).

The propagation of microwaves in an unmagnetized plasma near the plasma frequency, and in a strongly magnetized plasma near the cyclotron frequency is now considered. The dispersion relations for these two cases are shown in FIG. 2. The horizontal axis is the wave number k, which is $2\pi$ divided by the wavelength $\lambda$. The vertical axis is the angular frequency, $2\pi f$. The group velocity in the slope of the curve, $d\omega/dk$, so that the solid curve (plasma wave) has a group velocity that increases with frequency, while the dotted curve (right-hand cyclotron wave) has a group velocity that decreases with frequency near the cyclotron frequency.

If a uniform, unmagnetized plasma fills the wave guide, the dispersion relation is $$\omega^2 = k^2 c^2 + \omega_p^2 + \omega_C^2 \quad (2)$$

where $\omega_p$ is the plasma frequency and $\omega_{co}$ is the vacuum waveguide cutoff frequency. This is the same as an empty guide, except that the effective cutoff frequency is significantly increased with a plasma fill from $\omega_{co}$ to $(\omega_p^2 + \omega^2 c)^{\frac{1}{2}}$. The transverse mode structure is also similar to that of an empty guide. The plasma filled guide, as a dispersive medium, offers the advantage over the vacuum guide in that if $\omega_p \gg \omega_{co}$ the medium is highly dispersive far above the vacuum fundamental wave guide mode cutoff frequency. Thus mode competition, that is the tendency of modes other than that excited to be present at high frequency, can be eliminated with oversized waveguide radius (and therefore allowing large powers).

The power increase ratio of oversized guide over a vacuum guide is roughly the ratio of their cross sectional areas; this is due to the fact that power/area is usually the limiting factor.

Figure 3:
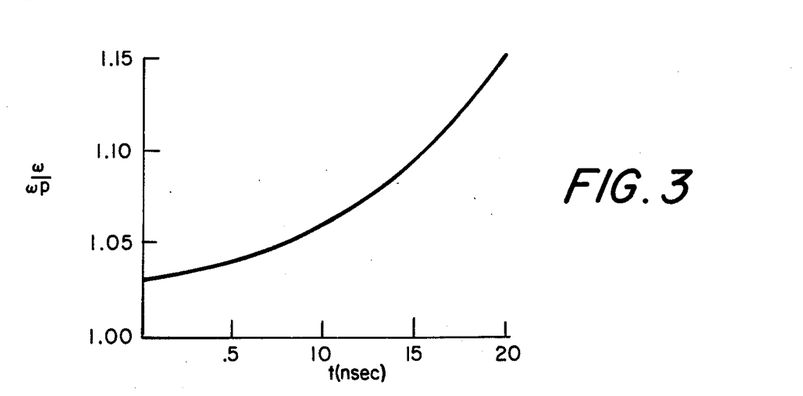
FIG. 3 is a diagram of the frequency as a function of time for optimum pulse compression in a 3 meter guide using an unmagnitized plasma.

When a frequency chirped wave enters the plasma region of a plasma filled waveguide, the wave number of the frequency chirped wave changes significantly even if the plasma density is chosen such that the input wave frequency is only slightly above the plasma frequency. Thus, if no precautions are taken, a large part of the signal will be reflected. However, the use of a transition cell of intermediate plasma density can eliminate this reflection. Using the fact that the group velocity is given by $V_g = d\omega/dk$, and that $\omega$ does not change as the signal enters the plasma, one can use Eqs. (1 and 2) to calculate the optimum frequency chirp for a 3 meter guide. The result is shown in FIG. (3) where an example of, a 20 nsec input radiation pulse is given. At the earliest time, the frequency is 3% above the plasma frequency. By moving the frequency further above the plasma frequency, the group velocity increases, so the optimum chirp is a frequency which increases with time, as expected.

Referring to the magnetized plasma, it is very dispersive near the electron cyclotron frequency $\Omega$. Moreover, the waves near $\Omega$ have very short wavelengths and slow group velocities. Because the group velocity becomes so small and the dispersion so great, very short guides can be used for pulse compression. Since the wave number in the plasma times the guide radius can now be assumed large, transverse effects can be ignored and only parallel propagation need be considered.

For right hand circular polarization, the dispersion relation is $$K^2 = \frac{\omega^2}{c^2} - \frac{\omega_p^2 \omega}{c^2 (\omega - \Omega)}, \quad (3)$$

where $\Omega$ is the nonrelativistic electron cyclotron frequency. Notice that if $\omega < \Omega$, k increases from $\omega/c$ to some much larger value as the plasma density is raised. At no intermediate density does it go through zero or infinity. Thus, if the density is adiabatically increased from zero, the wave will propagate into the plasma with very little reflection. Alternatively, one could use a plasma cell of intermediate density to reduce reflection. Once inside the plasma, (where $\omega \approx \Omega$) propagation is dominated by the plasma and $$k^2 \approx \frac{\omega_p^2 \Omega}{c^2 (\Omega - \omega)}, \tag{4}$$

and $$V_g \approx 2C \frac{(\Omega - \omega)^{3/2}}{\omega_p \Omega^{\frac{1}{2}}}. \tag{5}$$

Figure 4:
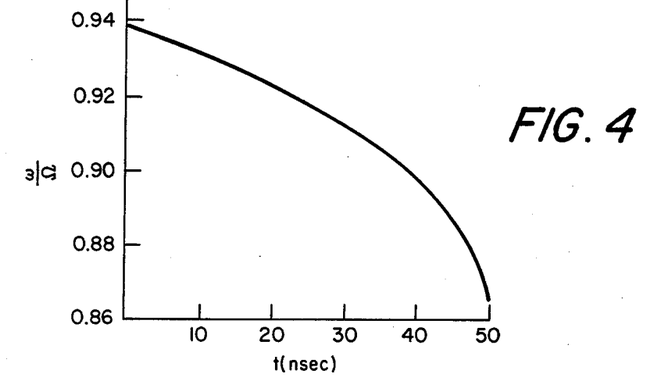
FIG. 4 is a diagram of the frequency as a function of time for optimum pulse compression using a 1 meter magnetized guide.

Then using Eqs. (1 and 5), one can again determine the optimum frequency chirp. Assuming for example, an X Band pulse so $\omega \simeq \Omega = 6 \times 10^{10}$, $\omega_{pe} = \Omega/2 = 3 \times 10^{10}$ cm$^{-3}$, $\omega(t=0)=0.95$, and a 1 meter long guide, the required pulse frequency as a function of time is shown in FIG. (4). Notice that the chirp needed is now a decreasing function of time.

It is also possible to compress a fixed frequency pulse using a very similar technique as described above. To make up for the fact that the input pulse has fixed frequency, it is necessary to change the properties of the dispersive medium in time. This will induce a frequency chirp, which then allows for pulse compression. For instance, if while the pulse is entering the plasma the magnetic field changes in time, then each element of the pulse sees a different time history. A calculation of the optimum time history of, say, the magnetic field is much more subtle than a calculation of the frequency chirp (Eq. (1)).

Here a formulation is presented of the problem which allows for a straightforward numerical calculation of $\Omega(t)$ (or whatever the time varying parameter is).

Assume the plasma begins at $x=0$; when the pulse propagates from just outside the plasma to just inside it, the frequency does not change upon entering the plasma, but the parallel wave number does change, because of the sharp spatial discontinuity. (The parallel wave number is the component of the wave number along the waveguide axis.) Once the pulse has entered the plasma it sees no additional spatial variation, since the plasma is uniform, so k is constant. But, since the medium does vary slowly in time, the wave frequency, $\omega$, also changes in time as the wave propagates through the guide.

The problem now is to determine the optimum time variation of the medium for pulse compression. The group velocity depends on the current time t, and also the time that the pulse entered $t_o$, so Vg is a function of two parameters, Vg (t, $t_o$). If some parameters (say the magnetic field) changes in time during the entry of the pulse into the plasma, the value of that parameter at time $t_o$ will be denoted y, and the value at time t will be denoted x. Now Vg can be expressed as Vg (x,y). It is shown in Ref. Manheimer and Ripin, Physics of Fluids, July 1986, that the optimum pulse compression is achieved when the dependence of y on time is given by $$\frac{dy}{dt} = \frac{-V_g(t_1 - n\Delta, t_1 - n\Delta)}{-T \frac{\partial V_g}{\partial y}\Big|_n^o + \sum_{j=o}^n \Delta \frac{\partial V_g}{\partial y}\Big|_n^j}. \tag{6}$$

Note that the derivative of y with respect to time at t depends on the entire previous history of y from $t_1$ to t. Since $y(t_1)$ is known and $V_g$ is a known function of x and y, Eq. (6) can be used to calculate y backwards from $t=t_1$ to $t=0$. At each iteration, the entire history over the known region $y(t_1, t, t_1-n)$ is used to calculate the rate of change of y with respect to t at $y(t_1-n)$. This allows the calculation of y at the next step, $n+1$, and so on until $t_o=0$. The same procedure holds for other time varying plasma parameters in lieu of y. For example, in the case the cyclotron frequency, $\Omega$, $y=\Omega$.

In the case of a time varying plasma frequency, the optimum $\omega_p$ follows a relationship similar to Eq. (6).

Keeping in mind the above calculation of Eq. (6), consider a fixed frequency wave with frequency $\omega$ enters the unmagnetized plasma region at $x=0$. The wave number for the part of the pulse that enters at time $t_o$, is given by $$k^2(t_o) = \frac{\omega^2 - \omega_p^2(t_o)}{c^2}. \tag{7}$$

The wave number remains constant at all subsequent times because once the pulse enters the plasma it is in a homogeneous medium. However, the frequency does change with time as the signal propagates because the density changes in time. The frequency is then a function of two variables, t, the actual time, and $t_o$, the time that portion of the pulse initially entered the plasma. Using the fact that $k^2$ is constant in Eq. (7), a relation for $\omega^2(t_1 t_o)$ is given by $$\omega^2(t,t_o) = \omega^2 + \omega_p^2(t) - \omega_p^2(t_o). \tag{8}$$

Since the group velocity is $V_g$ is given by the local dispersion relation, Eq. (2), in the varying medium, $V_g = kc^2/\omega$, it is found that the group velocity is also function of the two variables, t and $t_o$ i.e., $$V_g(t,t_o) = c(\omega^2 - \omega_p^2(t_o))^{\frac{1}{2}}/(\omega^2 + \omega_p^2(t) - \omega_p^2(t_o))^{\frac{1}{2}} \tag{9}$$

Changing variables, as before, and letting $\omega_p^2(t)=x$ and $\omega_p^2(t_o)=y$, allows Eq. (9) becomes to be expressed by $$V_g(x,y) = c(\omega^2 - y)^{\frac{1}{2}}/(\omega^2 + x - y)^{\frac{1}{2}}. \tag{10}$$

Now, the derivation leading up to Eq. (6) applies except that instead of $\delta\Omega$ and $d\omega/dt$, $\delta\omega_p^2$ and $\delta\omega_p^2/dt$ are used. Thus, Eqs. (10) and (6) give the optimum density time variation for pulse compression.

An estimate of the required density change is now given. If the pulse length of the entering pulse is $t_1$, the group velocity of the portion of the pulse which entered the plasma last is $$V_g(t_1, t_1) = c(\omega^2 - \omega_p^2(t_1))^{\frac{1}{2}}/\omega. \tag{11}$$

At time $t_1$ the group velocity of the part of the pulse that entered at $t=0$ is $$V_g(t_1,0) = c(\omega^2 - \omega_p^2(0))^{\frac{1}{2}}/\omega^2 + \omega_p^2(t_1) - \omega_p^2(0))^{\frac{1}{2}}. \tag{12}$$

$V_g(t_1, t_1)$ must be greater than $V_g(t_1,0)$ in order for there to be pulse compression. For this to be true, $\omega_p^2(t_1)$ $\omega_p^2(o)$; the density must be a decreasing function of time.

Figure 5:
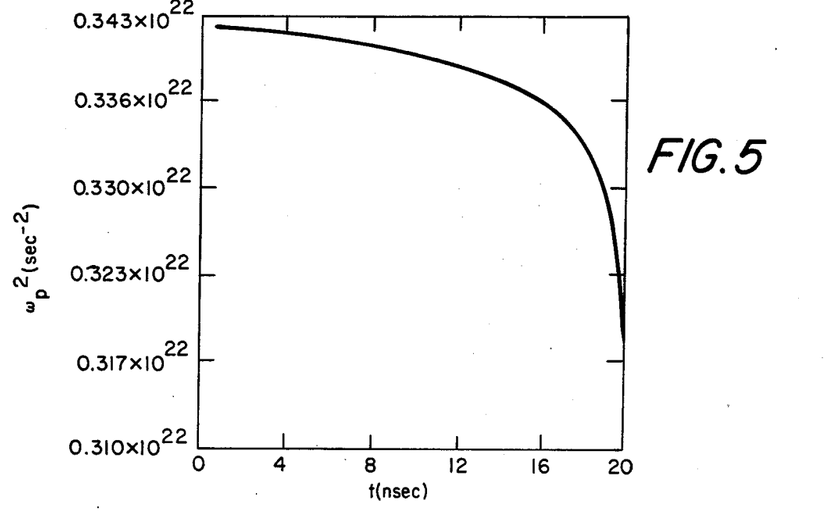
FIG. 5 is a diagram of the optimum density as a function of time for $\omega = 6 \times 10^{10}$ sec$^{-1}$, $t_1 = 20$ nsec, $T = 60$ nsec. The vertical axis is the plasma frequency squared.

FIG. (5) shows a calculation of the optimum density as a function of time. The vertical axis is $\omega_p^2$ in sec$^{-2}$. It was assumed, for example, that $t_1=20$ nsec, T=60 nsec and $\omega=6 \times 10^{10}$ sec$^{-1}$. The density is a decreasing function of time, as discussed above.

Since the required density drop is over a very short time scale, it is not feasible to rely on recombination or attachment to reduce the density. A more viable approach to reduce $\omega_p{}^2$ is to use an inverse theta pinch. Imagine that at t=0 the plasma is weakly magnetized so that $\omega_p \gg \Omega$. Thus, the magnetic field could confine the plasma, but it would have very little effect on wave propagation if $\omega \gg \Omega$. For instance in the X-band pulse compression example, a magnetic field of only 500 G ($\Omega = 9 \times 10^9$) could confine a plasma having $\omega_p \simeq 6 \times 10^{10}$ sec$^{-1}$. If the magnetic field changes quickly, the density should drop due to the fact that the plasma is frozen in the field. The variation in density should be approximately what is required if the magnetic field were reduced by 20% over the 20 ns pulse time. The flux change in the plasma over 20 nsec implies a voltage of only one kilovolt (for a single turn coil), an energy change of 0.1 Joule per centimeter and a power investment of 5 Megawatts per centimeter. These values are well within the range of modest pulsed power technology.

A second approach to pulse compression in a time-varying dispersive plasma is the propagation of right hand circularly polarized wave with frequency near the electron cyclotron frequency. In this case it is assumed that the cyclotron frequency changes with time. However, has just been shown, a change in cyclotron frequency implies a concomitant change in density, since over the nanosecond time considered, the plasma is frozen into the field (or $\omega_p{}^2 \Omega$ remains constant).

When the wave enters the plasma at time $t_o$ at fixed frequency $\omega$ its wave number becomes $$k^2(t_o) = \frac{\omega_p{}^2(t_o)\omega}{c^2(\Omega(t_o) - \omega)}, \qquad (13)$$

assuming $kc/\omega \gg 1$. As in the previous subsection, it is then determined that $$\omega(t,t_o) = \frac{\frac{\Omega(t)\omega_p{}^2(t_o)\omega}{\Omega(t_o) - \omega}}{\omega_p{}^2(t) + \frac{\omega_p{}^2(t_o)\omega}{\Omega(t_o) - \omega}}. \qquad (14)$$

Using the fact that the flux is frozen into the plasma and $\omega_p{}^2/\Omega$ is constant Eq. (14) becomes $$\omega(t,t_o) = \frac{\omega}{1 + \omega/\Omega(t)(1 - \Omega(t)/\Omega(t_o))} \qquad (15)$$

Figure 6:
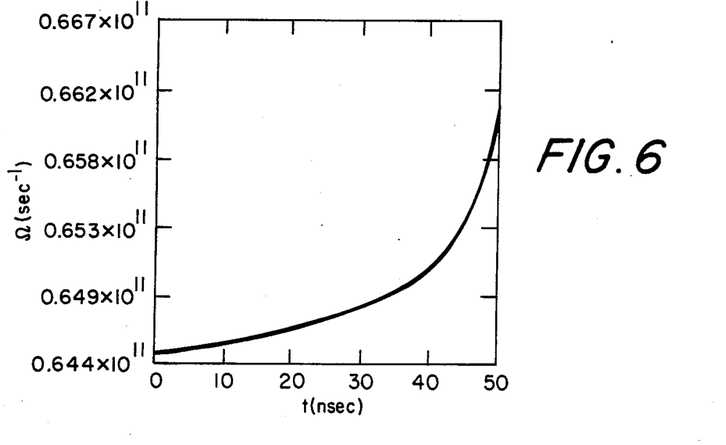
FIG. 6 is a diagram of the optimum magnetic field as a function of time for $\omega = 6 \times 10^{10}$ sec$^{-1}$, $t_1 = 50$ nsec and $T = 150$ nsec. The vertical axis is the plasma cyclotron frequency.

A similar calculation for the group velocity gives the result $$V_g(t,t_o) = \frac{2c}{\omega_{po}\Omega(t)} \left( \frac{\omega}{\Omega(t_1) - \omega} \right)^{\frac{1}{2}} \left( \Omega(t) - \frac{\omega}{1 + \frac{\omega}{\Omega(t)}\left(1 - \frac{\Omega(t)}{\Omega(t_o)}\right)} \right)^2 \qquad (16)$$

where $\omega_{po}$ is the plasma frequency at t=0. With $x=\omega(t)$ and $y=\Omega(t_o)$, Eq. (16) above is in the form given in Eq. (6), so that Eq. (6) can be used to calculate the optimum time dependence of $\Omega(t)$. One can now show with straightforward manipulations that if $V(t_1,t_1) > V(t_1,0)$, then $\Omega(t_1) > \Omega(o)$. Thus for pulse compression, the magnetic field must be compressed. From Eqs. (6) and (16), one can calculate the optimum dependence of the magnetic field in time. FIG. 6 shows the calculated dependence of $\Omega(t)$ for example of a 50 nsec pulse of microwave radiation with $\omega = 6 \times 10^{10}$ sec$^{-1}$ for a guide with T=150 nsec.

Physically, what happens to a microwave in the plasma in the unmagnetized and magnetized case will now be described.

Figure 7:
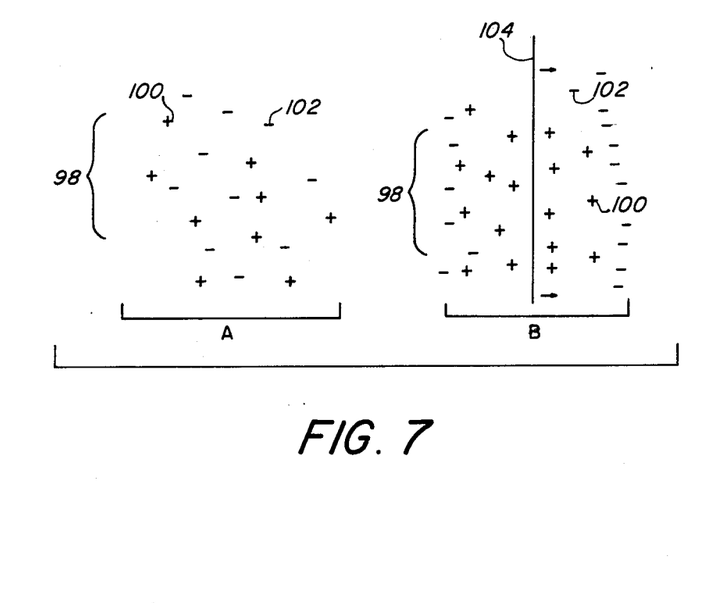
FIG. 7 is a schematic drawing of electrons and ions in an unmagnetized plasma.

Referring to FIG. 7 there are ions 100 and electrons 102 that make up the plasma 98. When a microwave 104 passed through the plasma the electrons 102 are pulled along with the wave 104 and away from the ions 100 to some extent. The amount of this pulling action is related to how close the frequency of the signal is to the natural frequency of the plasma $\omega_p$. This plasma frequency $\omega_p$ is the natural frequency with which the electrons 102 and ions 100 separate and restore. The closer the passing microwave signal frequency is to the plasma frequency, the greater the interaction of the wave and the plasma and the more dispersive the plasma will be. This is because the closer in frequency the wave is to the plasma frequency, the more the wave will interact with the plasma thus slowing down the wave. So, as the frequency chirped signal proceeds in the plasma, the more forward part or earlier in time part of the signal (with the leading edge having a frequency closest to the plasma frequency $\omega_p$) will slow more than that part of the chirped signal that is later in time due to the later in time signal being of higher frequency and further away from the plasma frequency $\omega_p$. By the time the entire chirped signal has proceeded through the plasma waveguide the later in time parts of the signal have caught up to the earlier in time part of the signal creating a very powerful, very short in time pulse from what before was a less powerful chirped signal of a longer time.

Figure 8:
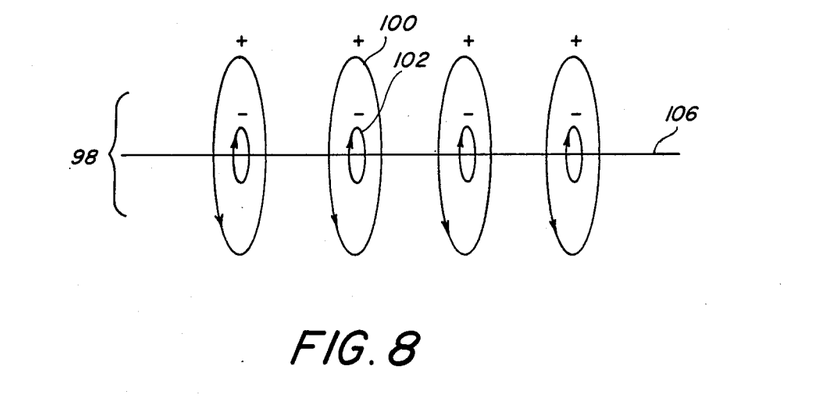
FIG. 8 is a schematic drawing of the electrons and ions in a magnetized plasma.

Similary, in the magnetized plasma case, the controlling factor is the cyclotron frequency $\Omega$ instead of the plasma frequency. Referring to FIG. 8 the electrons 102 and ions 100 rotate, or orbit, around magnetic field lines in the plasma at their cyclotron frequencies. Electrons orbit around the field lines 106 at their own unique frequencies as do ions. The primary electron mode of interest is near the cyclotron frequency, $\Omega$, As in the unmagnetized plasma with the plasma frequency $\omega_p$, the electron cyclotron frequency, $\Omega$ has analagous dispersive properties. The closer the frequency of an incoming wave to the frequency $\Omega$ the more it will interact and thus be slowed. Accordingly, a frequency chirped signal whose leading edge is closest to the cyclotron frequency $\Omega$ will be compressed into a powerful single short in time pulse when it leaves the waveguide. In the magnetized case, since there are many different modes at which the electrons 102 and ions 100 orbit the magnetic field lines, any of these modes could be taken advantage of in the fashion as described for the electron cyclotron frequency.

A preferred embodiment of many possible preferred embodiments will now be described.

Figure 9:
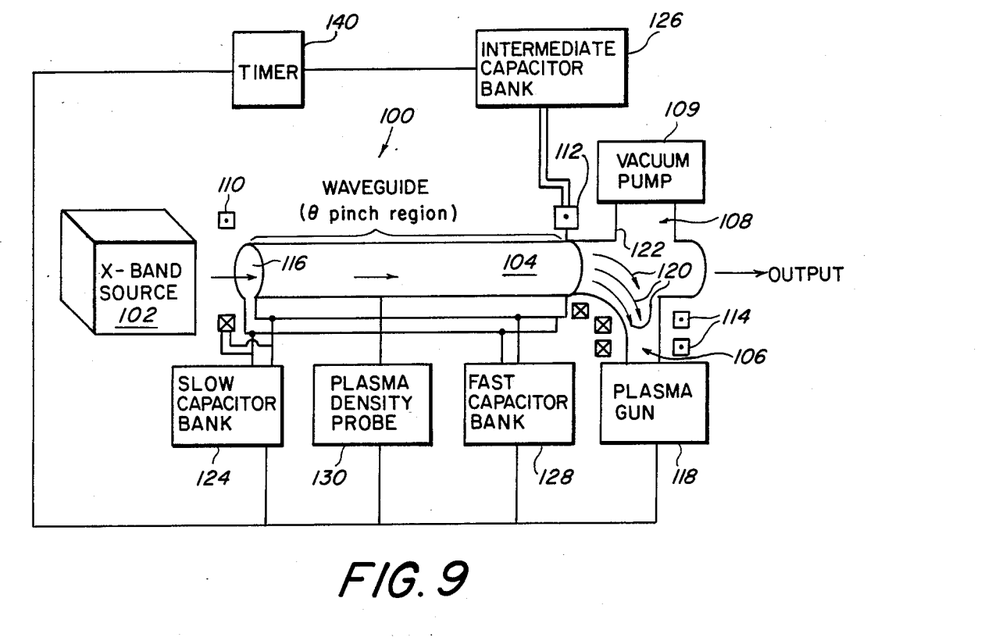
FIG. 9 is a schematic drawing of a fixed frequency-band source with a time-varying density plasma waveguide.

Referring to FIG. (9), there is shown a pulse compression device 100 for a fixed frequency X-band source with a time-varying density plasma waveguide. The pulse compressor device 100 is comprised of an X-band source 102 that produces a fixed frequency X-band signal at the desired time to be compressed by the time-varying plasma waveguide 104. The X-band source 102 can be a gyrotron that produces a 20 ns duration pulse at a frequency of 10 GHz at a power of 300 Mw, The plasma waveguide 104 is a cylindrical tube of copper having a length about 3 m and a diameter of about 10 cm. The waveguide 104 has an inlet port 106 for injecting plasma into the waveguide 104 and a vacuum port 108 for evacuating the waveguide with a vacuum pump 109 so as pure a plasma as possible exists in the waveguide 104.

The plasma is contained by magnetic fields produced by current passing through the copper waveguide 104 and coil 110, coil 112, and coils 114. The copper waveguide, being a conductor serves the additional purpose of being a long 1-turn coil, as well as a waveguide, and is a single-turn-pinch coil which supplies a magnetic field (B) of 300 Gauss. See D. A. Hammer, K. A. Gerber, W. F. Dove, G. C. Goldenbaum, B. G. Logan, K. Papadopoulos, and A. W. Ali, Phys. Fluids 21, 483 (1978) for further explanation of the design of an $\theta$-pinch coil.

Coil 110 acts as a mirror coil that prevents the plasma from escaping through the entry port 116 of the waveguide 104 and provides a B field of 600 G. Coil 112 is a mirror gate which is initially off to allow plasma to enter the waveguide 104 from the plasma source 118 such as a plasma gun via the inlet port 106 and provides a B field of 600 G. For further information about the operation of a plasma gun 1, see J. D. Sethian and C. A. Ekdahl, Phys. Rev. Lett. 42, 711 (1979). Coils 114 create the magnetic field necessary to guide the plasma from the plasma gun 118 through the inlet port 106 and into the waveguide 104. The magnetic field lines 120 are curved at the neck 122, and the electrons and ions follow them around. The neutrals emitted by the plasma gun 118 are unaffected by the magnetic fields and pass straight through the neck 122 from the inlet port 106 to the outlet port 108 and are unable to make the necessary turn to enter the waveguide.

A slow capacitor bank 124 provides current to coil 110, the waveguide 104 and coils 114 initially to confine and control the plasma. An intermediate capacitor bank 126 provides the current for gate coil 112. A fast capacitor bank 128 supplies the current to the $\theta$ pinch coil to reduce the B field at the proper time and allow the plasma to expand and lessen in density. A timing means 140 controls the overall timing required in the operation of the components. The lessening in the density of the plasma over time is what causes the pulse to compress, as explained previously.

A plasma density probe 130, which may be a resonant r.f. probe, is inserted into the waveguide 104 to determine when the plasma is at the correct density to fire the fast capacitor bank 128. Initially the plasma is injected at a density of about $10^{14}$ elec/cc. When the plasma has decayed to a density of about $1.24 \times 10^{12}$ elec/cc or an $\omega_o = 1.03 \, \omega_p$, the fast capacitor is fired.

Figure 10:
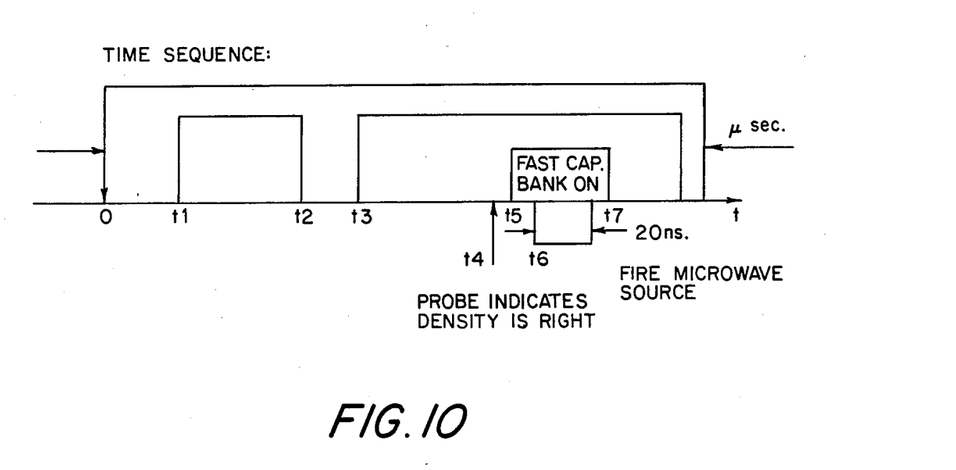
FIG. 10 is a diagram of the sequence of events in the operation of the invention as a function of time.

Referring now to FIG. 10, in the operation of the exemplary device 100, the slow capacitor 124 is turned at time $t=0$. Current then flows through the waveguide 104, coil 110 and coils 114. At a time $t_1$, the plasma gun 118 is fired supplying plasma to the waveguide 104 until a time $t_2$. At a time $t_3$, the intermediate capacitor 126 is turned on, supplying current to coil 112 and activating it, thus trapping the plasma in the waveguide. At a time $t_4$, the probe 130 indicates the plasma density in the waveguide is at the desired density and causes the fast capacitor 128 to be turned on at time $t_5$, thus causing the plasma to continually expand. At time $t_6$, the microwave source is fired causing a 20 ns pulse to enter the waveguide, and when the pulse has passed through the waveguide 104 and been output, does the fast capacitor 128 is shut off at time $t_7$. At $t_8$ the capacitor banks 126 and 124 are shut down ending the process. For the embodiment where the cyclotron frequency is important, the only difference is the magnetic field is increased causing the plasma to compress while the microwave passes through the waveguide. For the chirped signal embodiments, the magnetic field in the waveguide is kept constant.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A pulse compression apparatus for multiplying the power of microwaves by a factor of 10–100 times by compressing microwave pulses, comprising:
   means for injecting a dispersive plasma into a waveguide where the plasma subsequently allows microwaves of different frequencies to travel at different velocities,
   means for making the plasma steady-state, and
   means for introducing a chirped microwave pulse signal into the plasma thus shortening the microwave pulse signal to multiply the power of the microwave pulse signal as microwaves of different frequencies are compressed by the plasma.

2. An apparatus as described in claim 1 wherein the waveguide has a near-end and a far end, the near end being where the microwaves are introduced into the waveguide; wherein the means for injecting the plasma into the waveguide includes a plasma gun; a neck with an inlet port and an output end, said neck being attached to the far-end of the waveguide so the microwaves pass from the waveguide, through the neck and out through the output end, said plasma gun disposed before the inlet port of the neck so the plasma produced by the plasma gun will enter the neck region through the inlet port; and magnetic field means for guiding the plasma from the plasma gun into the waveguide; and wherein the means for making the plasma steady state is a second magnetic field means and a plasma density probe located in the waveguide.

3. A method for microwave pulse compression comprising the steps of:
   providing a steady-state dispersive plasma having a fixed plasma frequency in a waveguide filled with the plasma;
   creating a frequency chirped signal of microwaves with the signal having a leading edge and a remainder; and
   introducing the frequency chirped signal into the plasma filled waveguide where the plasma allows microwaves of different frequencies to travel at different velocities, said chirped signal having microwaves in said leading edge that are of higher frequency than said plasma frequency and are closer in frequency to the plasma frequency signal, thus shortening the signal's duration to produce microwave pulse compression in the chirped signal as faster moving microwaves from the remainder of the chirped signal catch up with slower moving microwaves from the leading edge of the chirped signal.

4. A method for microwave pulse compression comprising the steps of:
providing a dispersive plasma having a fixed plasma electron cyclotron frequency in a waveguide filled with the plasma;
creating a frequency chirped signal of microwaves with the signal having a leading edge and a remainder; and
introducing the frequency chirped signal into the plasma filled waveguide that allows microwaves of different frequencies to travel at different velocities, said chirped signal having microwaves in said leading edge that are of lower frequency than said plasma electron cyclotron frequency and are closer in frequency to the plasma electron cyclotron frequency than microwaves in the said remainder of the chirped signal thus shortening the signal's duration to produce microwave pulse compression in the chirped signal as faster moving microwaves from the remainder of the signal catch up with slower moving microwaves from the leading edge of the signal.

5. A pulse compression apparatus for multiplying the power of microwaves by a factor of 10–100 times by compressing microwave pulses comprising:
means for injecting a dispersive plasma into a waveguide where the plasma allows microwaves of different frequencies to travel at different velocities, and
means for making the plasma time-varying, and
means for introducing a fixed-frequency microwave signal into the plasma thus shortening the microwave signal to multiply the power of the microwave signal.

6. An apparatus as described in claim 5 wherein the waveguide has a near-end and a far end, the near end being where the microwaves are introduced into the waveguide; wherein the means for injecting the plasma into the waveguide includes a plasma gun; a neck with an inlet port and an output end, said neck being attacked to the far-end of the waveguide so the microwaves pass from the waveguide, through the neck and out through the output end, said plasma gun disposed before the inlet port of the neck so the plasma produced by the plasma gun will enter the neck region through the inlet port; and magnetic field means for guiding the plasma from the plasma gun into the waveguide; and wherein the means for making the plasma time-varying is a second magnetic field means and plasma density probe located in the waveguide.

7. A method of microwave pulse compression comprising the steps of:
providing a waveguide filled with a time-varying dispersive plasma having a time-varying plasma frequency with a leading edge and a remainder;
creating a fixed frequency signal of a frequency near the plasma frequency of plasma in the plasma-filled waveguide; and
introducing the microwave signal into the plasma filled waveguide containing the time-varying plasma that allows fixed frequency microwave signals to travel at different velocities in the time-varying plasma filled waveguide, said time-varying plasma frequency being lower than the microwave signal frequency with the leading edge being closer in frequency to the microwave signal than the remainder of the time-varying plasma frequency, thus shortening the signal's duration to produce microwave pulse compression in the fixed frequency signal as faster moving microwaves from the remainder of the signal catch up with slower moving microwaves from the leading edge of the signal.

8. A method of microwave pulse compression comprising the steps of:
providing a waveguide filled with time-varying plasma having a time-varying plasma electron cyclotron frequency with a leading edge and a remainder;
creating a fixed frequency signal of microwaves with the signal having a leading edge and a remainder; and
introducing the microwave signal into the waveguide containing the time-varying plasma to allow fixed-frequency microwave signals to travel at different velocities in the time-varying plasma filled waveguide, said time-varying plasma electron cyclotron frequency being higher than the microwave signal frequency with the leading edge being closer in frequency to the microwave signal than the remainder of the time-varying plasma frequency thus shortening the signal's duration to produce microwave pulse compression in the fixed frequency signal as faster moving microwaves from the remainder of the pulse catch up with slower moving microwaves from the leading edge of the pulse.

9. A pulse compression apparatus for multiplying the power of microwaves by a factor of 10–100 times by compressing microwave pulses, comprising:
a plasma-filled waveguide having a near end and a far end, the near end being where the microwaves are introduced into the waveguide and the far end being where the compressed microwave pulses exit the waveguide;
a neck with an inlet port and an output end, said neck being attached to the far end of the waveguide so that microwaves pass from the waveguide, through the neck and out through the output end;
a plasma source disposed before the inlet port of the neck so the plasma produced by the plasma source will enter the neck region through the inlet port;
first magnetic field means for guiding the plasma from the plasma source into the waveguide;
second magnetic field means disposed to create magnetic fields throughout the waveguide; and
a plasma probe located inside the waveguide and connected to the second magnetic field means to enable the second magnetic field means to provide the desired magnetic field in the waveguide.

10. An apparatus as described in claim 9 wherein the first magnetic field means is at a first conducting coil having at least one turn disposed around the inlet port of the neck and a current means, said current being electrically connected to the first coil; and wherein the second magnetic field means is a second conducting coil having at least one turn disposed around the near-end of the waveguide, said second coil electrically connected to the current means; a third conducting coil having at least one turn disposed around the far-end of the waveguide, said third coil electrically connected to the current means; and said waveguide, being of a conducting material, electrically connected to the current means.

11. An apparatus as described in claim 10 wherein the current means is at least one capacitor and at least one charging means connected thereto, and at least one timing means connected to the capacitor and to the plasma density probe, said timing means controlling the current flowing to the respective coils and waveguide based on the density of the plasma in the waveguide detected by the probe.

12. A method for multiplying the power of microwaves by a factor of 10-100 times, comprising the steps of:

injecting a dispersive plasma into a waveguide thus providing a plasma that will subsequently allow microwaves of different frequencies to travel at different velocities;

making the plasma steady state; and introducing a chirped signal of microwave pulses into the plasma thus shortening the duration of the chirped signal to multiply the power of the chirped signal introduced into the plasma as faster microwaves catch up with slower microwaves.

13. A method of multiplying the power of microwaves by a factor of 10-100 times, comprising the steps of:

injecting a dispersive plasma into a waveguide thus providing a plasma that will subsequently allow microwaves of different frequencies to travel at different velocities;

making the plasma time-varying; and introducing a fixed-frequency signal of microwave pulses into the plasma thus shortening the duration of the fixed-frequency signal to multiply the power of the chirped signal introduced into the plasma as faster microwaves catch up with slower microwaves.

* * * * *